(12) United States Patent
Criel et al.

(10) Patent No.: US 9,702,782 B2
(45) Date of Patent: Jul. 11, 2017

(54) METHOD AND SYSTEM FOR DETECTING A LEAK IN A FUEL SYSTEM (71) Applicant: Inergy Automotive Sys. Research (Societe Anonyme), Brussels (BE)

(72) Inventors: Bjorn Criel, Sint-Martens-Lennik (BE); Antoine Chaussinand, Brussels (BE); David Hill, Oakland, MI (US)

(73) Assignee: Inergy Automotive Systems Research (Societe Anonym), Brussels (BE)

( * ) Notice: Subject to any disclaimer, the term of this patent is extended or adjusted under 35 U.S.C. 154(b) by 1010 days.

(21) Appl. No.: 13/887,048

(22) Filed: May 3, 2013

(65) Prior Publication Data
US 2013/0297234 A1   Nov. 7, 2013

Related U.S. Application Data

(60) Provisional application No. 61/642,543, filed on May 4, 2012.

(30) Foreign Application Priority Data

May 25, 2012  (EP) ..................... 12169555

(51) Int. Cl.
| | | |
|---|---|---|
| *G01M 3/26* | (2006.01) | |
| *F02M 25/08* | (2006.01) | |
| *F01P 5/02* | (2006.01) | |
| *F02D 41/00* | (2006.01) | |
| *B60K 11/02* | (2006.01) | |
| *B60K 15/035* | (2006.01) | |

(Continued)

(52) U.S. Cl.
CPC ............. *G01M 3/26* (2013.01); *B60K 15/035* (2013.01); *F01P 5/02* (2013.01); *F02D 41/003* (2013.01);

(Continued)

(58) Field of Classification Search
CPC ........ F02M 31/00; F02M 31/20; F02M 25/08; F02C 9/00; G01M 17/0074; F25B 19/00; F28F 1/00

(Continued)

(56) References Cited

U.S. PATENT DOCUMENTS 5,419,299 A    5/1995  Fukasawa et al.
5,662,090 A *  9/1997  Ward ..................... F02M 31/16
                                             123/557

(Continued)

FOREIGN PATENT DOCUMENTS

DE            27 04 955 A1    8/1978
DE      10 2008 017 004 A1   10/2009

(Continued)

OTHER PUBLICATIONS

U.S. Appl. No. 13/887,042, filed May 3, 2013, Hill, et al.

(Continued)

*Primary Examiner* — Andrew Schechter
*Assistant Examiner* — Kaleria Knox
(74) *Attorney, Agent, or Firm* — Oblon, McClelland, Maier & Neustadt, L.L.P.

(57) ABSTRACT

It is proposed a method for detecting a leak in a fuel system of a combustion engine comprising a fuel tank. The method is such that it comprises the steps of:
  obtaining a first set of data comprising at least a pressure data measured in the fuel system at a first time;
  adding energy to fluids contained in the fuel system, said energy being produced or wasted by means already present on board the vehicle for other purposes;
  obtaining a second set of data comprising at least a pressure data measured in the fuel system at a second time;

(Continued)

determining the presence/absence of a leak in said fuel system by calculating a predetermined function on the basis of said first and second sets of data.

12 Claims, 6 Drawing Sheets

(51) Int. Cl.
    *B60K 1/00*         (2006.01)
    *B60K 15/03*      (2006.01)

(52) U.S. Cl.
    CPC ......... *F02M 25/0818* (2013.01); *B60K 11/02* (2013.01); *B60K 15/03504* (2013.01); *B60K 2001/005* (2013.01); *B60K 2015/03427* (2013.01); *B60K 2015/03514* (2013.01)

(58) Field of Classification Search
    USPC .......... 73/118.1, 118.01; 60/39.24; 165/177, 165/76; 62/7, 199; 123/557, 541; 702/51
    See application file for complete search history.

(56) References Cited

U.S. PATENT DOCUMENTS

| | | | | | |
|---|---|---|---|---|---|
| 5,991,481 | A | * | 11/1999 | Nuang | G02F 1/025 359/237 |
| 6,024,074 | A | * | 2/2000 | Koethe | F02M 31/20 123/541 |
| 6,138,466 | A | * | 10/2000 | Lake | B60H 1/00278 429/62 |
| 7,426,955 | B2 | * | 9/2008 | Kimura | F28D 1/05366 165/76 |
| 8,042,343 | B2 | * | 10/2011 | Jarlestal | B64D 13/00 244/118.5 |
| 8,991,481 | B2 | * | 3/2015 | Koch | B21C 37/14 165/134.1 |
| 2003/0074958 | A1 | * | 4/2003 | Nagasaki | F02M 25/0818 73/114.41 |
| 2011/0000182 | A1 | * | 1/2011 | Lasker | F02C 1/04 60/39.24 |

FOREIGN PATENT DOCUMENTS

| | | |
|---|---|---|
| EP | 0 343 785 A2 | 11/1989 |
| EP | 2 014 904 A2 | 1/2009 |
| JP | 2007-320331 | 12/2007 |
| JP | 2009-184392 | 8/2009 |
| JP | 2010-047046 | 3/2010 |

OTHER PUBLICATIONS

U.S. Appl. No. 13/887,052, filed May 3, 2013, Hill, et al.
European Search Report Issued Sep. 28, 2012 in the European Application No. 12169555.5 filed May 25, 2012.

\* cited by examiner

METHOD AND SYSTEM FOR DETECTING A LEAK IN A FUEL SYSTEM

The present invention relates to the detection of leaks in a liquid fuel system, preferably on board a hybrid vehicle while driving it in electrical mode.

Leak detection systems for fuel tanks and complete fuel systems are widely used and even mandatory in modern road vehicles equipped with internal combustion engines. Existing leak detection systems use for instance vacuum from the internal combustion engine to decrease the pressure inside the fuel tank. When it is detected that the decreased pressure is maintained over a certain period of time, the fuel tank is considered leak-free.

As the requirements for fuel economy and alternative fuel sources continues to move technology to electric vehicles, a type of vehicles known as plug-in hybrid electric vehicles (PHEV) has been created. These vehicles are designed to manage a predetermined distance in an all-electric mode, but have an internal combustion engine and associated liquid fuel tank on board to manage the times when the vehicle has exceeded its all-electric range.

Since these vehicles have the potential of running in an all-electric mode throughout the complete life of the vehicle, it is theoretically possible that the internal combustion engine will never run.

Nevertheless, in order to be compliant with applicable regulations, the liquid fuel system on the vehicle must periodically be subjected to leak tests, to ensure that there is no breach in the fuel system. As the regulations provide separate requirements with respect to a "small leak" and a "large leak", the leak detection systems generally provide separate procedures for these respective eventualities.

In existing systems, a small leak is normally diagnosed during an "engine off" event. In such systems, the system is tested by comparing pressure and temperature readings to infer if the system properly behaves like a closed system, in accordance with the ideal gas law. The test can be quite accurate with the engine off, as the fuel in the tank is not moving, which allows for a very accurate pressure reading. Such a test is for instance disclosed in U.S. Pat. No. 5,263,462.

A large leak test, on the other hand, generally relies on an energy input of negative pressure. This is achieved by providing a connection between the fuel tank and the internal combustion engine's intake manifold via a valve, and opening the valve when the intake manifold is at a negative relative pressure, in order to apply a vacuum to inner volume of the fuel system (mainly the tank and any conduits that are in direct fluid communication with it). Once a vacuum is created, the system is checked for a leak by closing the valve and observing the rate at which the vacuum decays. This test is both effective and efficient.

As stated above, however, the internal combustion engine may never run in the life of a PHEV, and there is a substantial probability that it will not run during the majority of the vehicle's drive cycles. Therefore, any test based on engine generated vacuum becomes an unsuitable means for testing for leaks in the fuel system.

Solutions have been proposed to test the fuel tank for leaks without the need for the internal combustion engine to run. These solutions comprise adding a dedicated, electrically powered vacuum or positive pressure pump to the fuel system. Such a pump is able to induce a vacuum or pressure on request, but at the cost of additional energy consumption and a significant number of extra components.

It is an object of the invention to provide an alternative leak detection system that can be run when the combustion engine is off on a regular car or on a hybrid vehicle regardless of whether or not the internal combustion engine is ever running.

To this end, the invention proposes a method for detecting a leak in a fuel system of a vehicle, in accordance with claim 1. The leak detection is based on a special case of the ideal gas law, whereby "energy" (heat or pressure) is added to the fuel system by using means already present on board the vehicle for other purposes. Generally, a fuel system comprises a fuel pump for delivering liquid fuel to the intake manifold of the combustion engine. For example, such fuel pump may be used to add energy to the fuel system. In a particular embodiment, when the combustion engine is on, the fuel pump can be powered more than required for operation of fuel delivery. In other words, the fuel pump can be powered with a supply current such that it allows correct fuel delivery to the intake manifold and allows heating the fluid contained in the fuel system. In another particular embodiment, when the combustion engine is off, the fuel pump can be powered for heating the fluid contained in the fuel system. Unlike vacuum, heat is a byproduct of nearly all energy transformation processes, and is therefore readily available in any powered vehicle even if the combustion engine is off. Also, pressure may be generated by existing devices (pumps) when the combustion engine is off.

In a particular embodiment, the determination of the integrity of the fuel system is made by calculating a function based on measurements of pressure, and comparing this function to a predetermined value.

In another particular embodiment, the determination of the integrity of the fuel system is made by calculating a function based on measurements of pressure and temperature, and comparing this function to a predetermined value.

In another particular embodiment, the determination of the integrity of the fuel system is made by calculating a function based on measurements of pressure and temperature and on an information of fuel flowing out of the fuel system, and comparing this function to a predetermined value. By this way, the change in pressure due to the fuel suction outside the tank is taken into account. Thus, the determination of the presence/absence of a leak can be more accurate.

In yet another particular embodiment, the determination of the integrity of the fuel system is made by calculating a function based on measurements and/or estimations of pressure and/or temperature, and comparing this function to a predetermined value.

Advantageously, if the fuel system is determined to be sealed (no leak), the pressure temperature relationship can be used to predict the Reid Vapor Pressure of the fuel.

Preferably, the method is provided for detecting a fuel system leak in a (plug-in) hybrid vehicle, preferably when the combustion engine is off but the electrical engine is running.

According to a first embodiment of the present invention, the step of adding "energy" to the fuel comprises the steps of:

closing fuel injection valves at the internal combustion engine;

powering fuel pump so as to heat and stir fuel in the fuel tank thereby adding energy (heat and pressure) to the fuel.

In this embodiment, which can both be applied to a regular (combustion engine) vehicle and to a (plug in) hybrid vehicle, provided the combustion engine is off (not running), heat and pressure is added to the fuel via components which are already present in the vehicle for other purposes than adding heat to the fuel. In normal use, the fuel pump feeds the engine with pressurized fuel. During the test, the closing of fuel injection valves at the internal combustion engine prevents the fuel under pressure from going into the engine and returns it instead to the fuel tank. As a result, the fuel in the tank is stirred, heated and pressurized.

According to a second embodiment of the present invention, the step of adding energy to the fuel comprises the step of exchanging heat between batteries of a plug-in hybrid vehicle and the fuel tank. In this embodiment, waste energy in the form of battery heat, which will be disposed of, is used to heat the fuel. In this embodiment, heat does not need to be produced, it is only transported to the fuel. Transporting heat requires considerably less energy than producing heat.

In a first sub-embodiment, the heat exchange is obtained by guiding a flow of air successively over a heat exchanger of the batteries coolant circuit and over the fuel tank.

In a second sub-embodiment, the heat exchange is obtained by pumping a cooling liquid successively near the batteries and near the fuel tank, preferably inside of it.

Preferably, this cooling liquid is circulating in a heat exchanger inside the fuel tank and is fixed at several points of the tank wall so as to act as reinforcement.

According to a third embodiment, pressure is directly induced in the fuel system by pumping air into the system via means of a coolant driven air pump. This pump can be added in any coolant circuit on the vehicle, for instance the one mentioned above for the batteries or the one of the air condition system of the vehicle.

The present invention further relates to a fuel system comprising a fuel tank, a temperature sensor, a processor and means for adding energy to fluids contained in the fuel system, said energy being produced or wasted by means already present on board the vehicle for other purposes;

said temperature sensor and said pressure sensor being arranged to measure conditions inside said fuel tank and operatively connected to said processor;

wherein said processor is configured to carry out the method as described above.

The invention further relates to a motor vehicle with a fuel system according to the invention, and to a computer program for use in a fuel system according to the invention.

These and other aspects and advantages of the invention will be further clarified with respect to the accompanying figures, in which.

In a particular embodiment of the invention, the integrity (absence of leak) of the fuel system can be determined by comparing a first pair of measurements ($p_1$, $T_1$) with a second pair of measurements ($p_2$, $T_2$), the second pair being taken after controlled introduction of an amount of heat and/or pressure to the fuel tank. The present invention is further based on the insight that this determination can be made without using the engine or a dedicated device generating heat and/or pressure but instead, by using such heat/pressure source available on the vehicle, preferably a (plug-in) hybrid vehicle.

The determination of the integrity of the fuel system can be made by calculating a function of the four measured variables ($p_1$, $T_1$, $p_2$, $T_2$), and comparing this function to a predetermined value.

In an exemplary way, the predetermined value may be a ratio of two pressure-temperature ratios, determined before and after the addition of energy to the fuel system, respectively. If the value of this "ratio of ratios" is outside a predetermined range, the existence of a fuel leak may be declared.

The "ratio" analysis is based on the premise that, for a closed system, the pressure (p)/absolute temperature (T) ratio is constant:

$$\frac{p_1}{T_1} = \frac{p_2}{T_2}$$

The above equation, known as Gay-Lussac's law is a special case of the ideal gas law, which states that $$pV = nRT$$

in which the volume (V) of the gas system and the quantity (n) of gas particles also appear.

For a system with constant volume, a set of measurements in which $$\frac{p_1}{T_1} > \frac{p_2}{T_2}$$

is indicative of a decrease in the quantity of gas in the system ($n_1 > n_2$), which could signify the presence of a leak.

There is typically an amount of liquid fuel inside the fuel system, as well as a gaseous phase consisting of a mixture of fuel vapor and air. The measurements and calculations cited above may be applied to the gaseous phase. However, the pressure of the gaseous phase will be influenced by the vapor pressure of the fuel in the tank, which is in turn influenced by the temperature of the system. As a result, it can become necessary to incorporate additional data elements (i.e. factors) to the basic function of ratios. For example, these data elements can include the influence of a fuel's intrinsic vapor pressure, and the base temperature at which the test begins, to further define this vapor pressure level.

In the event that there is no internal pressure in the tank at the beginning of the test, the system must rely on the fact that a temperature rise will result in a pressure rise based on the change in temperature and the factors stated above. Based on this, it is possible to determine to some degree of accuracy the leak in the system, since we have a theoretical P2 and an actual P2.

The FIGS. 1, 2, 3, 5 and 6 show a fuel system 1 that is in fluid communication with a charcoal canister 2 via fluid line 4. The charcoal canister 2 has another fluid line 5 connected to the intake manifold 3 of the internal combustion engine. A valve 6 is disposed in the fluid line 5 to allow for selective communication between the charcoal canister 2 and the intake manifold 3. There is an additional communication between the charcoal canister 2 and the atmosphere. This communication can be selectively controlled via a valve 8 to create completely sealed system. An additional valve 7 is placed on the intake manifold 3 commonly known as the throttle valve, to control the amount of intake air. The fuel system further comprises a pressure sensor 9 adapted for measuring the pressure inside the fuel tank 1.

An additional valve (not pictured) could be disposed in the fluid line 4 for isolating the tank 1 from the canister 2 to avoid unwanted loading of the vapor storage canister 2. In this case the valve (not pictured) would ideally be open during the test, in order to test the complete system.

FIGS. 1, 2, 3 and 6 show a battery cooling system as present in a plug-in hybrid vehicle. The cooling system comprises a battery 10 which is cooled via a cooling fluid flowing through a first heat exchanger 11 for taking up heat at the side of the battery 10. The cooling fluid furthermore flows through a second heat exchanger 12 for being cooled down. The cooling fluid is pumped via a pump 13 from the first heat exchanger 11 to the second heat exchanger 12 and back, thereby flowing in a closed loop.

The fuel tank of FIGS. 1, 2, 3, 5 and 6 further comprises a temperature sensor 19. Although the figures show only one temperature sensor 19 and only one pressure sensor 9, several of these sensors can be placed at strategic locations in the fuel tank to get a more detailed measurement of temperatures and pressures present in the fuel tank. As explained above, in a closed fuel tank, leaks can be detected via pressure and temperature information before and after a temperature change.

Figure 1:
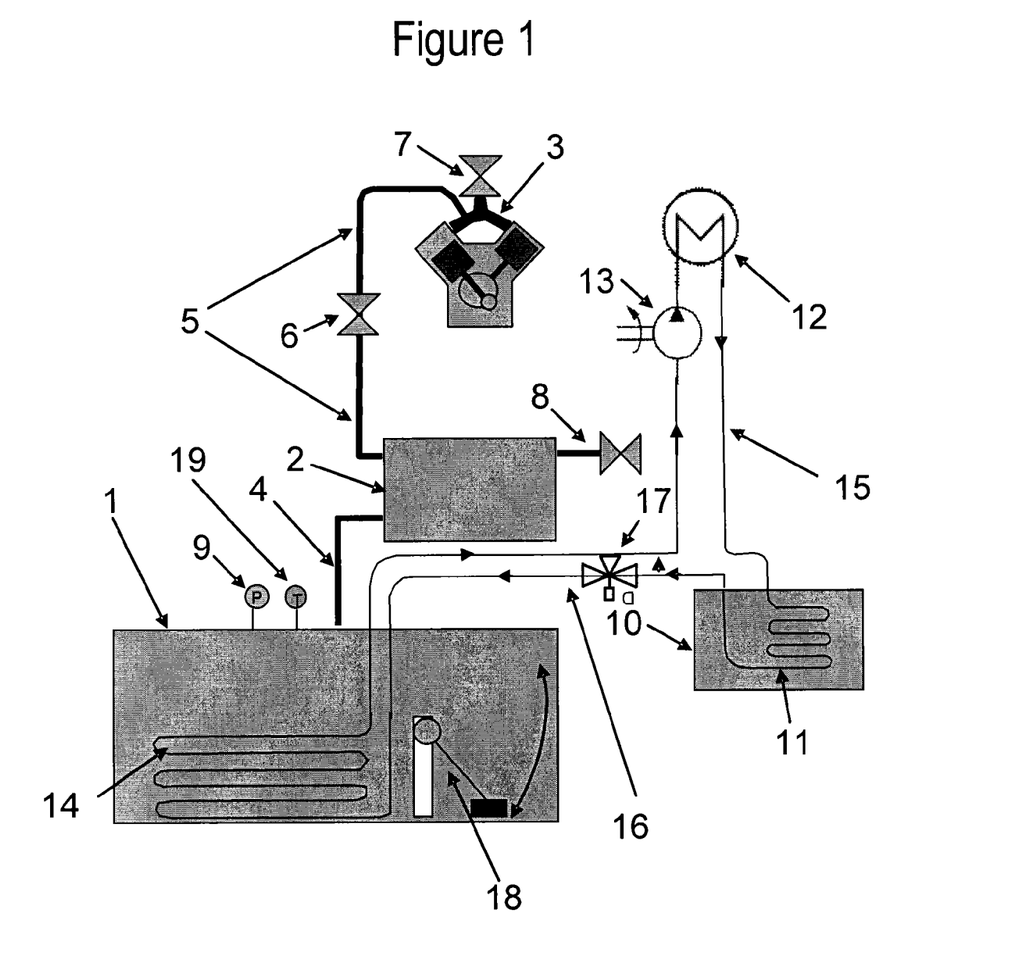
FIG. 1 illustrates a fuel tank system according to one embodiment of the invention.

In one embodiment of the invention, as shown in FIG. 1, battery heat is used to heat the fuel in the fuel tank. To this end, a third heat exchanger 14 is provided inside the fuel tank. A three-way valve 17 is provided in the cooling liquid circuit, whereby the three-way valve can direct the cooling liquid to the second heat exchanger 12 without passing through the third heat exchanger 14 (normal operation) and whereby the three-way valve can direct the cooling liquid to the third heat exchanger 14, so that heat is transferred to the fuel in the tank 1. In this manner, so-called waste energy, heat from the batteries, is used as energy input in the leak detection process, thereby making this process energy efficient. No extra energy has to be produced, because pump 13 runs anyway to cool the batteries.

To further enhance the accuracy of the leak detection system, a fuel level input 18 could be used in a preferred embodiment, to establish the heat capacity of the fuel present in the fuel tank. Since there is a different thermal mass that needs to be heated in a full tank as compared to a substantially empty tank, the temperature rise inside the tank could potentially be different depending on the fuel level when adding energy to the tank.

Figure 2:
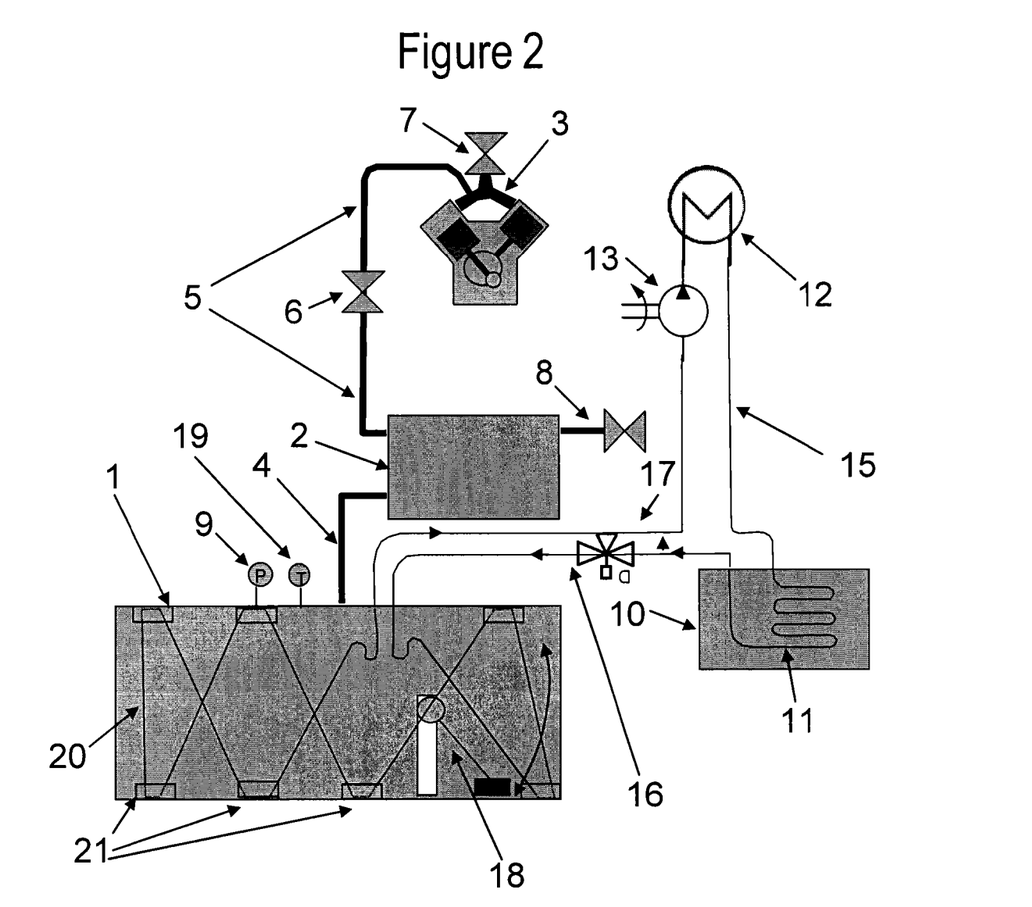
FIG. 2 illustrates a fuel tank system according to another embodiment of the invention.

FIG. 2 shows an embodiment similar to the embodiment of FIG. 1 that could be used in the case that the fuel tank (1) needs to resist to internal pressure (which is generally the case with hybrid vehicles). In this embodiment, the regular heat exchanger 14 is replaced by a reinforcing heat exchanger 20 disposed in the tank 1 and which is in the shape of a structural member or truss system. The vertices of the heat exchanger 20 are attached to the inner surface of the tank 1 via an interface piece 21 which is either welded or rivet snapped to the interior of the tank.

Figure 3:
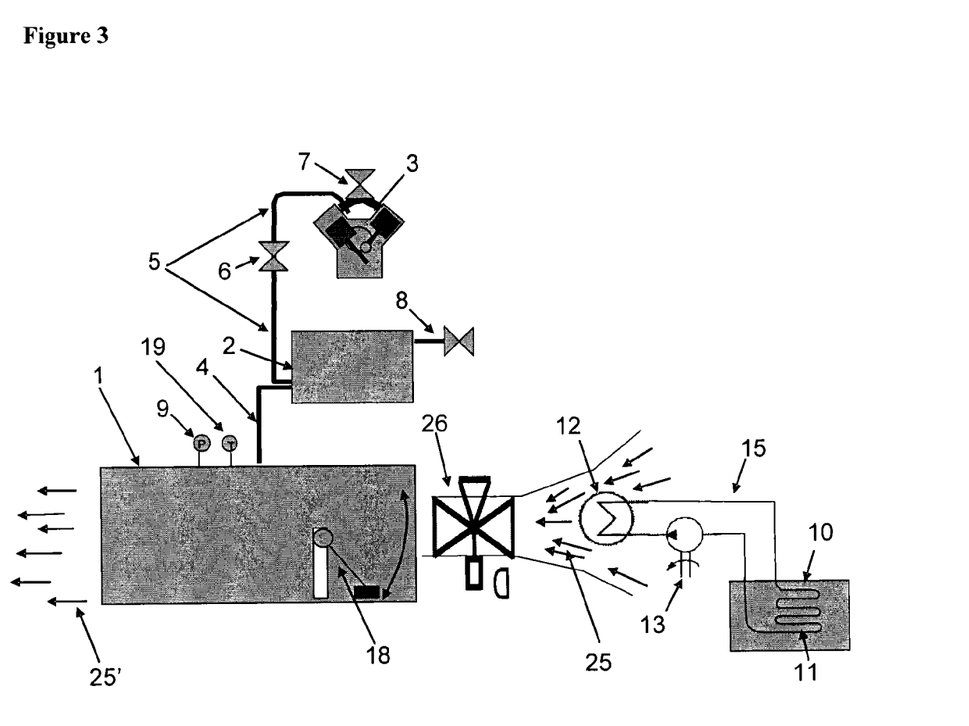
FIG. 3 illustrates a fuel tank system according to another embodiment of the invention.

FIG. 3 shows yet another embodiment similar to the embodiment of FIGS. 1 and 2, whereby battery heat is used to heat the fuel inside the fuel tank. However battery heat is not directly transferred to the fuel or fuel tank via the cooling liquid, but is transferred via air flowing over the second heat exchanger 12 when cooling down the cooling liquid at the second heat exchanger 12. The air flowing over the second heat exchanger 12 is guided in a channel comprising an air directing valve 26. The valve 26 is provided either to direct the air away from the fuel tank 1, or to direct the air to flow over and directly adjacent the fuel tank 1 so that the energy (heat) captured by the air in the second heat exchanger 12 is partially transferred to the fuel tank 1 thereby heating the fuel tank 1 and the fuel. An advantage of this embodiment is that the cooling liquid does not enter the fuel tank 1 so that there is no risk of fluid exchange/contamination between the two systems.

Figure 4:
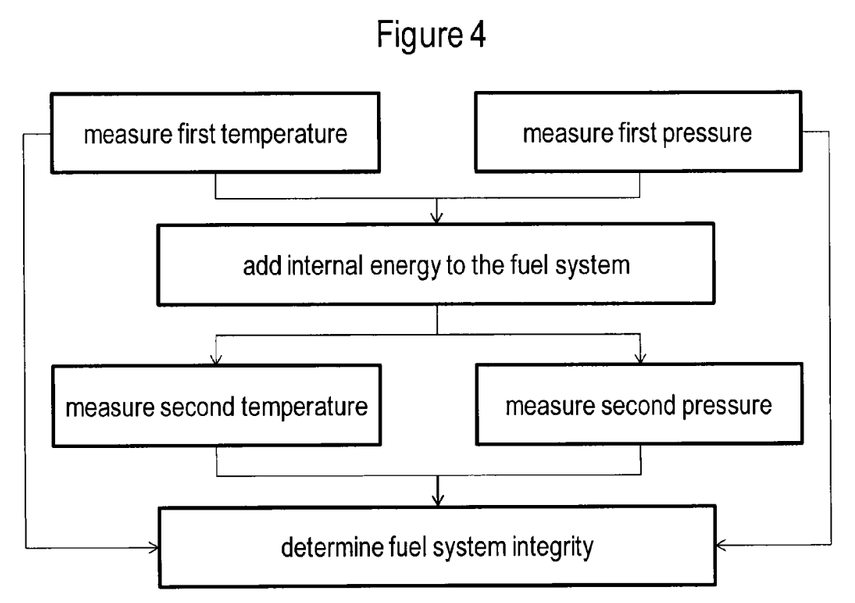
FIG. 4 represents a flow chart of a method according to an embodiment of the present invention.

A flow chart explaining the method according to the invention is shown in FIG. 4. The flowchart shows, in a first step, the measurement of a first temperature and a first pressure. After the first step, energy is added to the fuel system as second step. As explained in relation with the FIGS. 1, 2, 3, 5 and 6, several techniques can be applied to add energy to the fuel system. In a third step, a second temperature and a second pressure are measured. Finally the first temperature and pressure measurement and the second temperature and pressure measurement are used as factors in a predetermined formula for calculating a leak factor indicative of the chance of presence of a leak.

Signaling the presence of a leak can then, the case being, be conducted in any suitable manner known to the skilled person, for example by lighting up an indicator at the dashboard of the vehicle.

Figure 5:
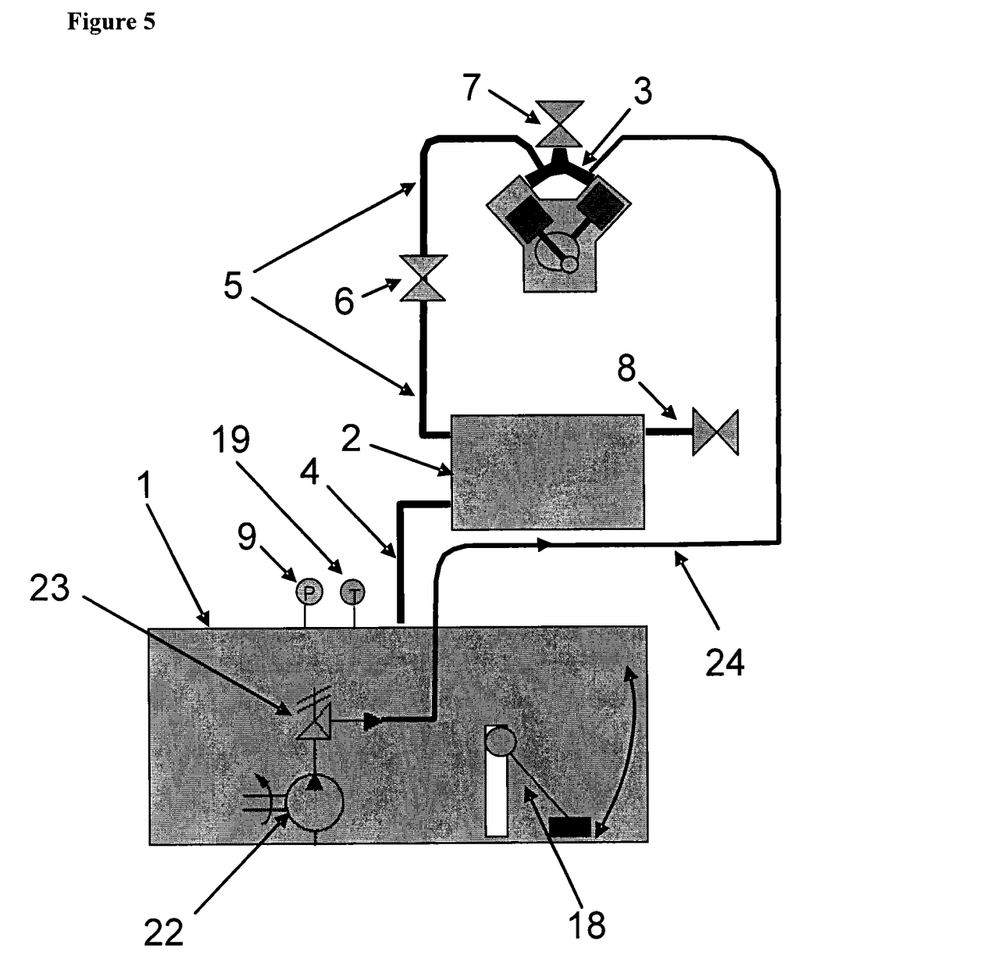
FIG. 5 illustrates a fuel tank system according to another embodiment of the invention.

FIG. 5 shows an alternative embodiment of the present invention, whereby the energy added to the fuel system does not originate from the batteries. In this embodiment, a fuel pump 22 is disposed in the fuel system 1 to deliver liquid fuel to the intake 3. To regulate the pressure that is delivered to the intake 3 a pressure regulator or bypass valve 23 is disposed in the system. In this embodiment, a control strategy would be implemented to close the fuel injectors on the engine intake 3 and send power to the fuel pump 22 causing it to heat up. The heat from the fuel pump 22 would in turn heat up the fuel at a specified rate linked to the physical properties of the pump. Since the fuel injectors are closed, fuel would be recirculated back into the fuel tank 1 causing for additional pressure generation due to the effect of turbulence in the fluid. Based on the pressure rise due to the addition of heat and turbulence, it can be determined if the fuel system has a leak or not.

Figure 6:
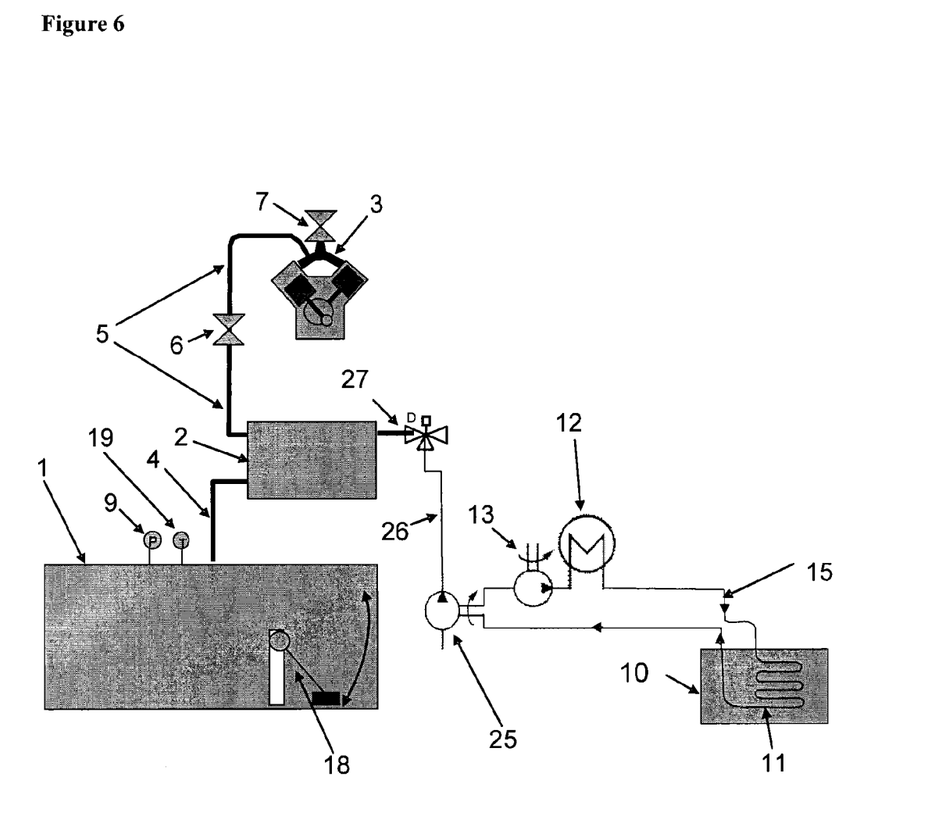
FIG. 6 illustrates a fuel tank system according to still another embodiment of the invention.

FIG. 6 depicts another embodiment of the invention in which pressure is directly induced in the fuel system 1 by pumping air into the system via means of a coolant driven air pump 25. In this embodiment, a pump 13 is used to flow coolant through a heat exchanger 11 in the vehicles battery 10 to cool it, as in the embodiments of FIGS. 1 to 3. After exiting the battery 10, the fluid flows through the disclosed air pump 25 (which is like an impeller powered by the flow of coolant) and then through a heat exchanger 12 that is used to further cool the fluid before being cycled back through the battery 10. In normal operation, a diverter valve 27 diverts the air flow from the pump 25 to the atmosphere, resulting in minimal loading on the pump 25. When a leak check is commanded by the vehicle, the diverter valve 27 directs the flow of air from the canister 2 into the tank 1 and seals the port to the atmosphere. As a result, the pressure in the tank increases at a known rate, allowing the vehicle to determine if there is a leak in the system. If there is a leak, naturally the pressure rise will be lower than that of a sealed system. The pressure sensor (9) can be used to measure this.

Although the invention has been disclosed by means of a limited number of concrete embodiments, this was done to illustrate the invention, and not to limit its scope. The skilled person shall understand that features described in connection with specific embodiments may be combined with features from other embodiments to achieve the corresponding effects and advantages.

The invention claimed is:

1. A method for detecting a leak in a fuel system of a combustion engine of a hybrid vehicle, the fuel system comprising a fuel tank and a fuel pump, the fuel system providing fuel to the engine for combustion of the fuel by the engine, the method comprising:
   obtaining a first set of data comprising at least a pressure data measured in the fuel system at a first time;
   then powering the fuel pump so as to heat fuel in the fuel tank, thereby adding energy to the fuel;
   then obtaining a second set of data comprising at least a pressure data measured in the fuel system at a second time;
   then determining a presence/absence of a leak in said fuel system by calculating a predetermined function based on said first and second sets of data.

2. The method according to claim 1, wherein said first set of data further comprises a temperature data measured in the fuel system at the first time, and said second set of data further comprises a temperature data measured in the fuel system at the second time.

3. The method according to claim 1, wherein said predetermined function is further calculated based on information relative to the fuel flowing out of the fuel system during a time interval between the first and second times.

4. The method according to claim 1, wherein the combustion engine is on board of a hybrid vehicle comprising an electrical engine.

5. The method according to claim 4, which is performed when the combustion engine is not running but when the electrical engine is running.

6. The method according to claim 4, wherein the hybrid vehicle is a plug-in hybrid vehicle.

7. The method according to claim 1, wherein adding energy to the fuel comprises:
   closing fuel injection valves at the combustion engine.

8. The method according to claim 7, wherein the fuel system comprises a recirculation path of the fuel configured to maximize movement of the fuel and/or mixing of the fuel with air and vapor.

9. The method according to claim 1, wherein pressure is directly induced in the fuel system by pumping air into the fuel tank using a coolant driven air pump.

10. The method according to claim 1, wherein a fuel level input is used to establish a heat capacity of the fuel present in the fuel tank.

11. A fuel system comprising a fuel tank, a temperature sensor, a pressure sensor, a processor and a mechanism to conduct the adding of the energy to fluids contained in the fuel system, said energy being produced or wasted by another mechanism already present on board the vehicle for other purposes; said temperature sensor and said pressure sensor being arranged to measure conditions inside said fuel tank and operatively connected to said processor; wherein said processor is configured to carry out the method of claim 1.

12. A non-transitory computer readable medium having stored thereon a computer program for use in a fuel system comprising a fuel tank, a temperature sensor, a pressure sensor, a processor and a mechanism to conduct the adding of energy to fluids contained in the fuel system, said energy being produced or wasted by another mechanism already present on board the vehicle for other purposes; said temperature sensor and said pressure sensor being arranged to measure conditions inside said fuel tank and operatively connected to said processor, wherein said processor is configured to carry out, when executed, the method according to claim 1.

* * * * *

UNITED STATES PATENT AND TRADEMARK OFFICE
CERTIFICATE OF CORRECTION

PATENT NO. : 9,702,782 B2
APPLICATION NO. : 13/887048
DATED : July 11, 2017
INVENTOR(S) : Bjorn Criel et al.

Page 1 of 1

It is certified that error appears in the above-identified patent and that said Letters Patent is hereby corrected as shown below:

On the Title Page

Item (73), the Assignee's information is incorrect. Item (73) should read:
--(73) Assignee: Inergy Automotive Systems Research
              (Societe Anonyme), Brussels (BE)--

Signed and Sealed this
Tenth Day of April, 2018

Andrei Iancu
*Director of the United States Patent and Trademark Office*